J. M. BAKER.
TIRE ARMOR.
APPLICATION FILED OCT. 10, 1919.
1,384,817.
Patented July 19, 1921.
2 SHEETS—SHEET 2.
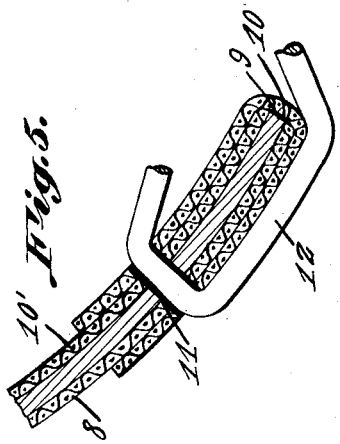
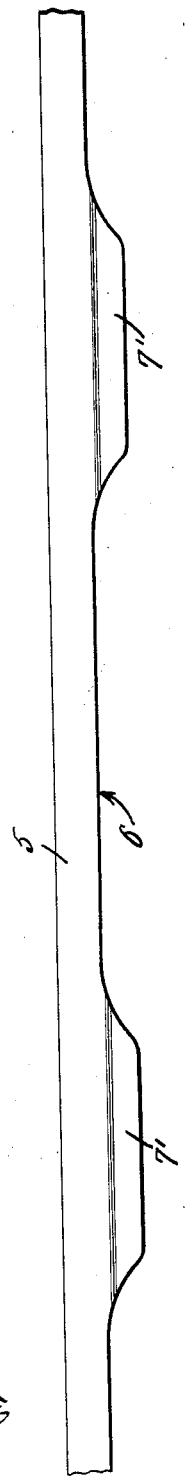
J. M. Baker, Inventor
By C. A. Snow & Co.
Attorneys
Witness

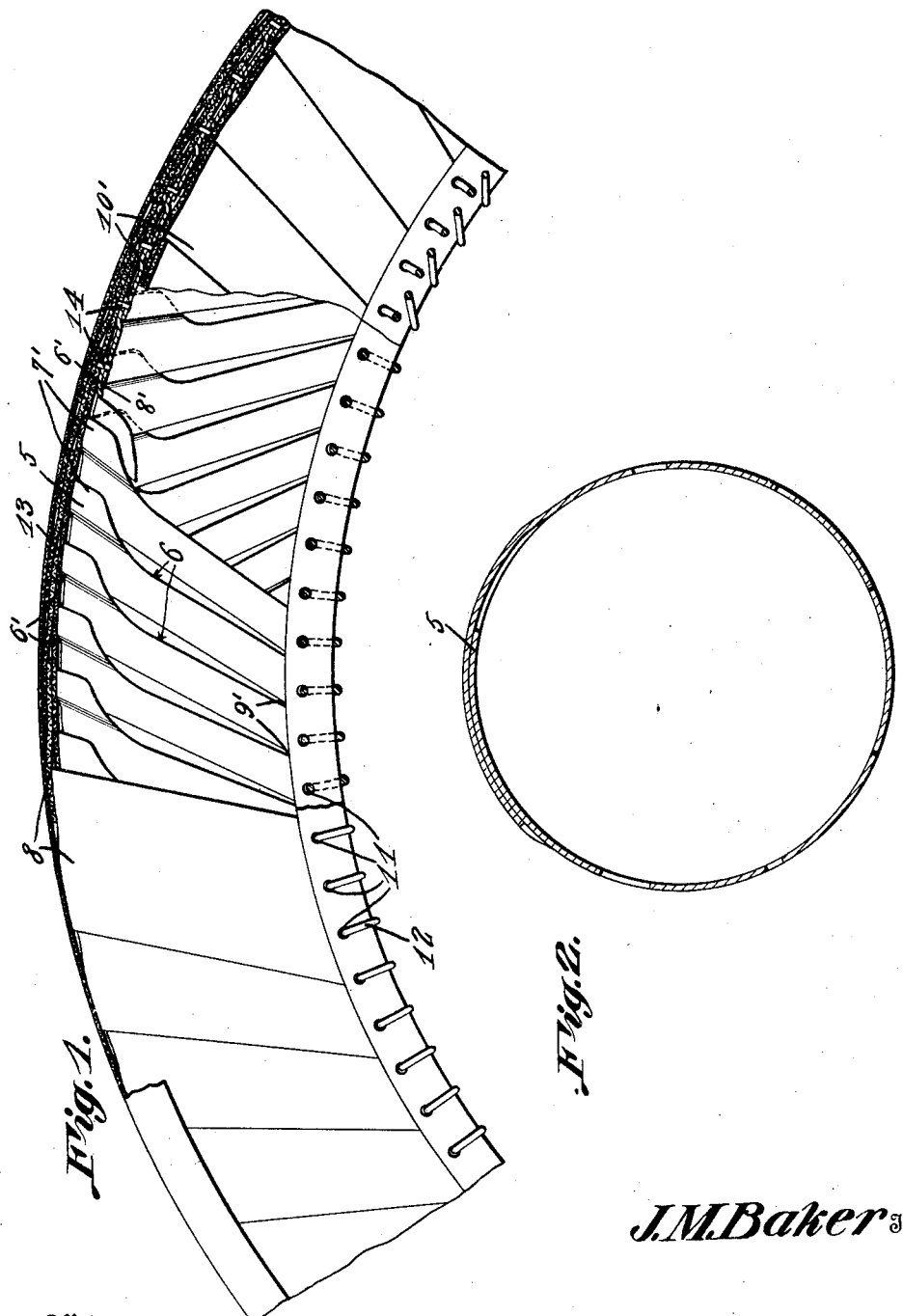

UNITED STATES PATENT OFFICE.

JULIAN M. BAKER, OF TARBORO, NORTH CAROLINA.

TIRE-ARMOR.

1,384,817.  Specification of Letters Patent.  Patented July 19, 1921.

Application filed October 10, 1919. Serial No. 329,720.

*To all whom it may concern:*

Be it known that I, JULIAN M. BAKER, a citizen of the United States, residing at Tarboro, in the county of Edgecombe and State of North Carolina, have invented a new and useful Tire-Armor, of which the following is a specification.

This invention relates to new and useful improvements in tire construction, and more particularly to an armor employed in connection with pneumatic tires, for preventing puncture of the inner tube thereof, and consequently reducing tire troubles to a minimum.

The primary object of the invention is to provide a flexible metallic armor to practically house the inner tube of the tire, the same being interposed between the inner tube and inner surface of the casing, for restricting the expansion of the inner tube, caused by excessive friction, thereby preventing blow outs, and consequently materially increasing the life of a pneumatic tire supplied with a protector constructed in accordance with the present invention.

A further object of the invention is to provide a device of this character which may be readily and easily positioned within a tire casing of the usual construction without the necessity of changing the construction thereof, and one which will lend resiliency to the ordinary pneumatic tire.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a fragmental elevational view partly in section, of a tire armor constructed in accordance with the present invention.

Fig. 2 illustrates a transverse sectional view through the tire and armor.

Fig. 3 is a diagram of the steel band.

Fig. 4 is a sectional view of the overlapping edges.

Fig. 5 is a sectional view of one of the edges of the armor.

Referring to the drawing in detail, the invention is shown as including a continuous metallic strip indicated at 5, which metallic strip is formed preferably of spring steel, or it might be formed of any spring material capable of preventing deflation by forces which would rupture, tear, or puncture the inner tube.

The body 5, or strip of spring steel, is formed in a successive and continuous spiral, one edge of the spring steel being provided with cut out portions 6, the tongue 7' formed by the cut out portion 6, being offset as at 6', to provide a shoulder 8' adapted to receive the opposite edge of the spring steel contacting therewith or overlapping edge thereof, in order that the overlapping edges 7 will not move with relation to the adjacent portion of the body of the strip.

It is thus obvious that when the strip is coiled as described, the side edges of one convolution are adapted to contact with the adjacent convolution, at the lower edges formed by the adjacent cut out portion, as at 9'.

A covering 8, of canvas, or other suitable cloth, is secured to the outer surface of the body, by means of cement, the inner surface of the protector being also covered with a canvas covering 10', which covering engages the inner tube of the tire, to protect the inner tube against contact with rough surfaces which might be formed on the inner surfaces of the guard or body 5.

In the construction of the protector, after the strip of metal is properly coiled, the central or inner periphery thereof, is severed as at 9, to provide an inner continuous slot 10, which slot provides means to permit an inner tube to be inserted therein, the portions of the metallic strip adjacent the slot 10, being provided with the openings 11, which openings accommodate a continuous flexible lacing element 12, which lacing element, brings the edges of the slot 10 into engagement with each other, after the inner tube has been properly positioned within the protector.

It might be further stated that the protector is formed with such a degree of curvature as to make a perfect adaptation, to the contour of the interior surface of the outer casing, as well as the outer surface of the inner tube, due allowance being made for the difference in radius of the outer and inner circumference of both the outer casing, and inner tube.

In order that the sections, formed by the slot 10, may be held in proper relation with each other, at the tread portion thereof, the metallic strip 13, may be provided which extends around the periphery of the protector, the sections being secured thereto by means of the rivets 14, which as shown, pass through the metallic strip 13, and enter the sections of the protector under the canvas or cloth covering 8', so that the protruding ends of the rivets are guarded from engagement with the inner tube.

This metallic strip 13 may be eliminated, in which construction, the rivets will extend through the overlapping portions of the adjacent convolution.

In applying a protector, as above described, to a tire, the inner surface of the outer casing is thoroughly coated with cement, the protector is then positioned within the outer casing, the covering 8 becoming firmly united with the outer casing, so that radial movement of the protector, within the casing, is absolutely prevented.

Having thus described the invention, what is claimed is:

1. A protecting casing comprising a plurality of spirally arranged sections, each of said sections having cut away portions providing tongues, each of said tongues being offset to accommodate the adjacent edge of the adjacent section, a covering for connecting the sections, and a binding medium for connecting the ends of the sections.

2. A protecting casing comprising a plurality of spirally arranged metallic sections, the adjacent edges of the sections being disposed in spaced relation with each other throughout a portion of the lengths of the sections, means for securing the sections together, at the tread portions thereof, and means for connecting the sections at the ends thereof.

3. A protecting casing comprising a plurality of spirally arranged sections, said sections having overlapping portions, said sections having the lower adjacent edges thereof disposed in spaced relation and means for connecting the sections.

In testimony that I claim the foregoing as my own, I have hereto affixed my signature in the presence of two witnesses.

JULIAN M. BAKER.

Witnesses:
W. F. WOOTEN,
E. F. ANDREWS.